United States Patent
Wang (10) Patent No.: US 12,058,958 B2
(45) Date of Patent: Aug. 13, 2024

(54) OPERATING ROD ASSEMBLY AND STRING TRIMMER

(71) Applicant: Globe (Jiangsu) Co., Ltd., Changzhou (CN)

(72) Inventor: Chaoyi Wang, Changzhou (CN)

(73) Assignee: Globe (Jiangsu) Co., Ltd., Changzhou (CN)

( * ) Notice: Subject to any disclaimer, the term of this patent is extended or adjusted under 35 U.S.C. 154(b) by 385 days.

(21) Appl. No.: 17/553,840

(22) Filed: Dec. 17, 2021

(65) Prior Publication Data
US 2022/0192088 A1 Jun. 23, 2022

(30) Foreign Application Priority Data
Dec. 22, 2020 (CN) .......................... 202023115392.6

(51) Int. Cl.
*A01D 34/416* (2006.01)
*A01D 101/00* (2006.01)

(52) U.S. Cl.
CPC ........ *A01D 34/416* (2013.01); *A01D 2101/00* (2013.01)

(58) Field of Classification Search
None
See application file for complete search history.

(56) References Cited

U.S. PATENT DOCUMENTS

| | | | | |
|---|---|---|---|---|
| 5,884,403 | A | * 3/1999 | Rogers | A01G 3/08 30/296.1 |
| 6,546,596 | B2 | * 4/2003 | Grote | B05C 17/0205 16/113.1 |
| 7,314,096 | B2 | * 1/2008 | Shaffer | B25F 5/026 172/372 |
| 2014/0190017 | A1 | * 7/2014 | Maynez | A01D 34/416 173/217 |
| 2020/0305570 | A1 | * 10/2020 | Zuo | B62J 9/10 |
| 2022/0192088 | A1 | * 6/2022 | Wang | F16B 7/1454 |

FOREIGN PATENT DOCUMENTS

| | | | | |
|---|---|---|---|---|
| EP | 3715236 A1 | * 9/2020 | ......... | A45C 13/262 |
| EP | 4018806 A1 | * 6/2022 | ......... | A01D 34/416 |

\* cited by examiner

*Primary Examiner* — Hwei-Siu C Payer (57) ABSTRACT

The disclosure provides an operating rod assembly and a string trimmer. The operating rod assembly includes a first rod provided with a first limiting piece, a second rod provided with a second limiting piece and a connector for connecting the first rod and the second rod. An outer diameter of the second rod is smaller than an inner diameter of the first rod; the first limiting piece and the second limiting piece are matched to limit the relative rotation angle between the first rod and the second rod. When the connector is in a locking state, two ends of the connector respectively lock the first rod and the second rod; when the connector is in a loosening state, the connector releases the second rod or the first rod, and the first rod and the second rod can rotate and stretch relative to each other.

18 Claims, 10 Drawing Sheets

OPERATING ROD ASSEMBLY AND STRING TRIMMER

CROSS REFERENCE TO RELATED APPLICATION

The present application is related to and claims the benefit of priority of Chinese patent applications serial No. 202023115392.6, filed Dec. 22, 2020; the disclosures of which is hereby incorporated by reference in it entirely for all purposes.

TECHNICAL FIELD

The disclosure relates to an operating rod assembly and a string trimmer with the operating rod assembly.

BACKGROUND

Garden tools such as string trimmers, hedge trimmers are used for cutting weeds in lawns, gardens, pastures. Due to the fact that the operating rods of the string trimmers, hedge trimmers are long, larger space may be occupied during storage and transportation, thus the transportation efficiency is reduced, and the transportation cost is increased. Therefore, the operating rod is usually divided into two sections, and the two sections are assembled into a single body by a metal or plastic connector. The telescopic motion of the operating rod is mainly realized by loosening and disengaging a connector between two sections of rods to realize relative motion. Due to the fact that the string trimmer with the functions of grass mowing and trimming two-in-one needs to rotate the operating mechanism relative to the operating rod so as to realize function switching, a rotating mechanism is newly added at the end portion, close to the operating mechanism, of the operating rod so as to realize function switching. However, such rotating mechanism not only increases the size of the machine, affects the beauty, but also has a complicated structure, and greatly increases the production cost of the product.

In view of the above problems, it is necessary to provide a new operating rod, in order to solve the above problems.

SUMMARY

The disclosure provides an operating rod assembly, the operating rod assembly can not only realize the telescopic function, but also realize the rotation function, and it has simple structure, convenient operation, low production cost, and improves the user experience.

The disclosure provides an operating rod assembly, the operating rod assembly includes a first rod, a second rod, and a connector. The first rod is hollow and is provided with a first limiting piece; an outer diameter of the second rod is smaller than an inner diameter of the first rod; the second rod is provided with a second limiting piece matched with the first limiting piece so as to limit a rotation angle of the first rod around the second rod; the connector is used for connecting the first rod and the second rod; when the connector is in a locking state, two ends of the connector respectively lock the first rod and the second rod; when the connector is in a loosening state, the connector releases the second rod or the first rod, and the first rod and the second rod can rotate and stretch relative to each other.

As a further improvement of the disclosure, the first limiting piece is a guide protrusion protruding from an inner wall of the first rod to the second rod; the second limiting piece is a limiting groove sinking inward from an outer wall of the second rod; the limiting groove is matched with the guide protrusion to limit the rotation angle between the first rod and the second rod.

As a further improvement of the disclosure, the first limiting piece is a limiting groove recessing inward from an inner wall of the first rod; the second limiting piece is a guide protrusion protruding from an outer wall of the second rod to the first rod.

As a further improvement of the disclosure, the second rod includes a rod body and a pipe sleeve arranged at one end of the rod body; the second limiting piece is arranged on the pipe sleeve.

As a further improvement of the disclosure, the rod body is provided with a first fixing portion, and the pipe sleeve is provided with a second fixing portion matched with the first fixing portion so as to fix the pipe sleeve on the rod body; the pipe sleeve includes a first pipe body accommodated in the second rod and a second pipe body arranged outside the second rod, and the second limiting piece is arranged on the second pipe body; the second fixing portion is a fixing protrusion protruding from an intersection of the second pipe body and the first pipe body along an axial direction of the second rod to the rod body; the first fixing portion is a fixing groove concaving inwards from a side wall of the rod body along an axial direction of the rod body.

As a further improvement of the disclosure, the connector includes a first connecting mechanism fixedly arranged on the first rod and a second connecting mechanism matched with the second rod; the second connecting mechanism includes a second connecting portion which is C-shaped and is used for clamping the second rod and a second locking portion which is used for locking two ends of the second connecting portion; when the second locking portion is changed from the releasing state to the locking state, the two ends of the second connecting portion gradually approach under the action of the second locking portion, so that an inner diameter of the second connecting portion is gradually reduced, and the second rod is locked.

As a further improvement of the disclosure, the second connecting portion includes a second connecting main body and a second extending portion extending outwards from one side of the second connecting main body; the second connecting main body is integrated with the first connecting mechanism, and a gap is formed between the second extending portion and the first connecting mechanism.

As a further improvement of the disclosure, the second locking portion includes a second screw passing through both ends of the second connecting portion and an operating member having an eccentric protrusion; the operating member is pivotally arranged on the second screw by a second pivot, the second pivot being slidable along the second screw.

As a further improvement of the disclosure, the first connecting mechanism includes a first connecting portion which is C-shaped and is used for clamping the first rod and a first locking portion which is used for locking two ends of the first connecting portion; when the first locking portion is changed from the releasing state to the locking state, the two ends of the first connecting portion gradually approach under the action of the first locking portion, so that an inner diameter of the first connecting portion is gradually reduced, and the first rod is held.

As a further improvement of the disclosure, the first connecting portion includes a first connecting main body and a first extending portion extending outwards from one end of the first connecting main body; the first connecting main body and the second connecting main body are an integrated component, and a gap is formed between the first extending portion and the second extending portion.

As a further improvement of the disclosure, an inner side of the first connecting portion is provided with a rib matched with the first rod so as to enhance friction between the first connecting portion and the first rod.

As a further improvement of the disclosure, a first positioning portion is arranged on the inner side of the first connecting portion, and a second positioning portion matched with the first positioning portion is arranged on the first rod so as to limit a relative rotation between the first rod and the first connecting portion through the matching of the first positioning portion and the second positioning portion.

The disclosure also shows a string trimmer, the string trimmer includes an operating mechanism, a handle assembly and the operating rod assembly, wherein the operating mechanism is arranged at one end of the operating rod assembly, and the handle assembly is arranged at the other end of the operating rod assembly.

The beneficial effect of the disclosure is that the operating rod assembly not only can realize the telescopic function, but also can realize the rotary function, and is simple in structure, convenient to operate, low in production cost and capable of improving user experience.

DETAILED DESCRIPTION

In order to make the objectives, technical solutions and advantages of the disclosure clearer, the disclosure will be described in detail below with reference to the accompanying drawings and specific embodiment.

Figure 1:
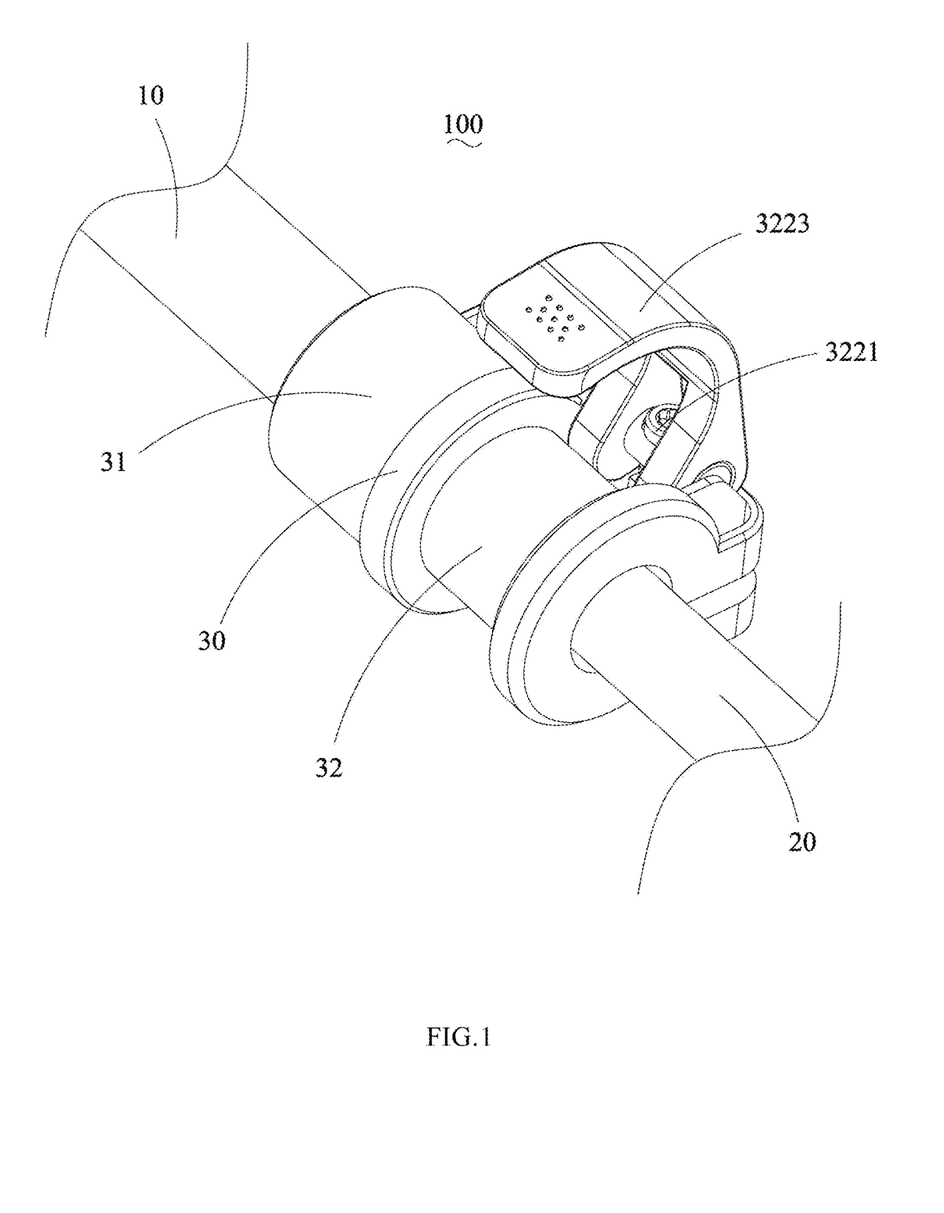
FIG. 1 is a perspective view of an operating rod assembly.
Figure 2:
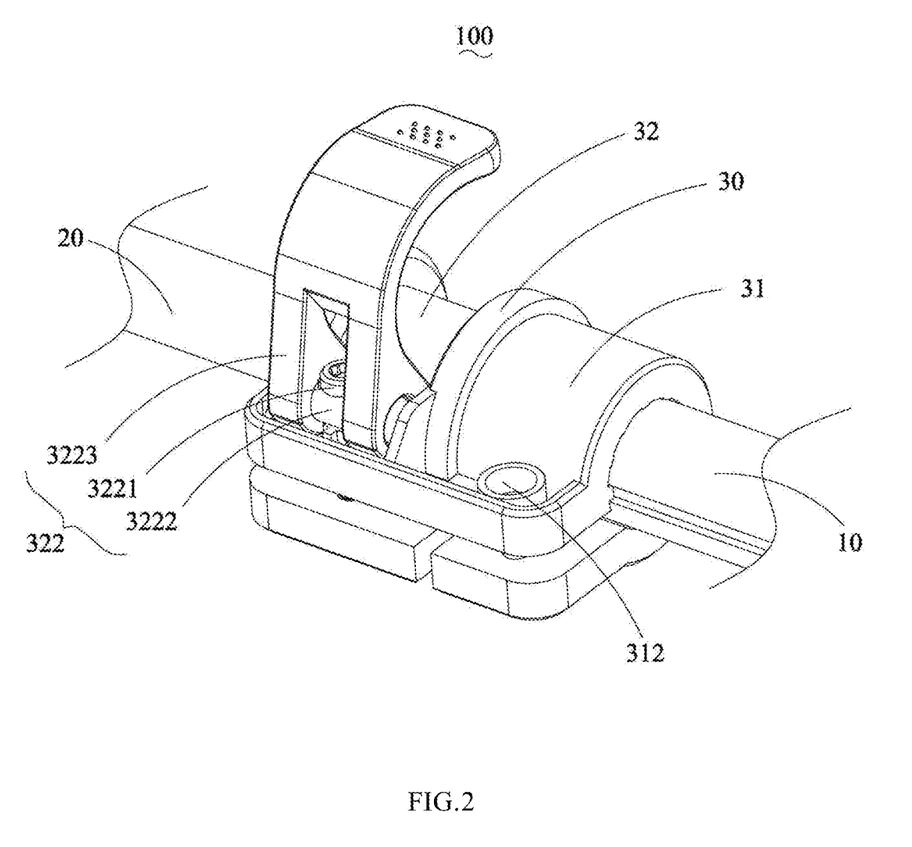
FIG. 2 is a perspective view of a second angle of the rod assembly of FIG. 1.
Figure 3:
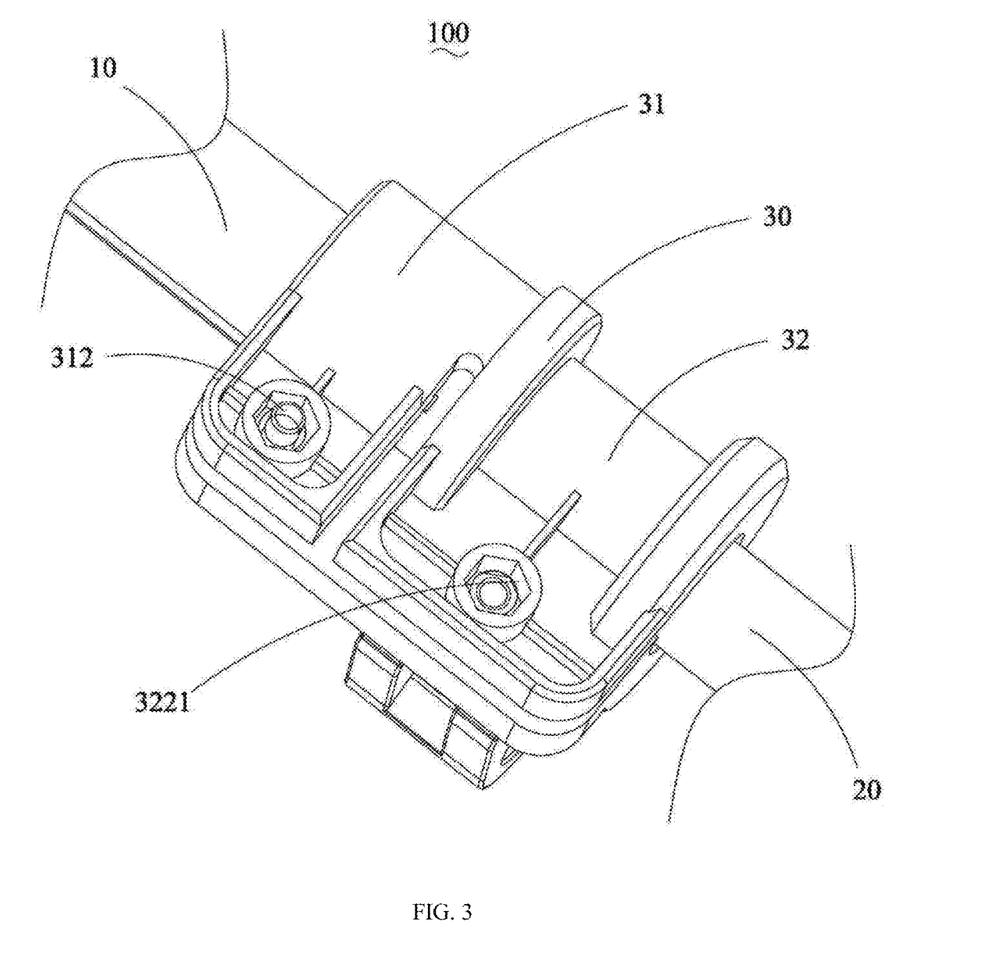
FIG. 3 is a perspective view of a third angle of the rod assembly of FIG. 1.

Referring to FIGS. 1, 2 and 3, the disclosure shows an operating rod assembly 100 for performing a telescopic function and a rotary function. The operating rod assembly 100 includes a first rod 10, a second rod 20, and a connector 30. The connector 30 is used for connecting and fixing the first rod 10 and the second rod 20 together. When the connector 30 is in the locked state, both ends of the connector 30 hold the first rod 10 and the second rod 20, respectively, so that the first rod 10 and the second rod 20 are fixed together. When the connector 30 is in a released state, the connector 30 releases the second rod 20 or the first rod 10, and relative rotation and expansion can occur between the first rod 10 and the second rod 20.

Figure 4:
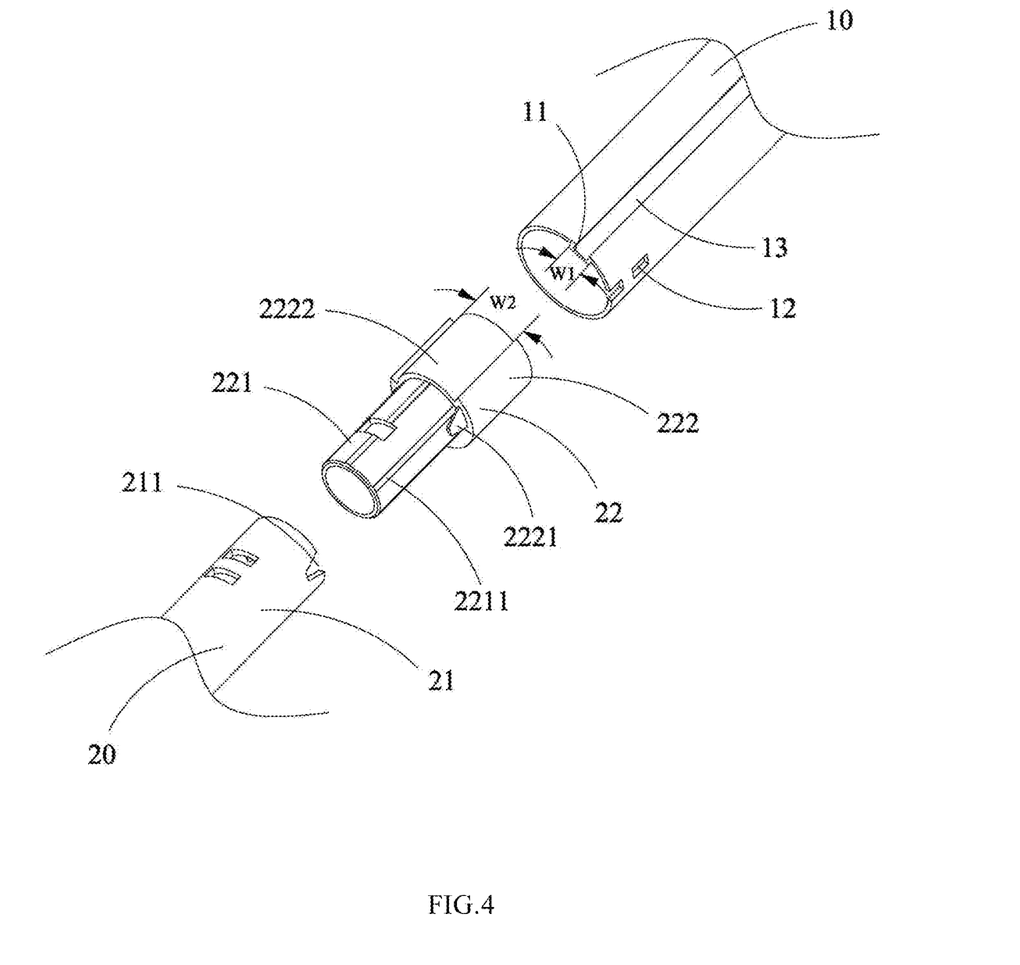
FIG. 4 is an exploded view of the first rod and second rod.
Figure 5:
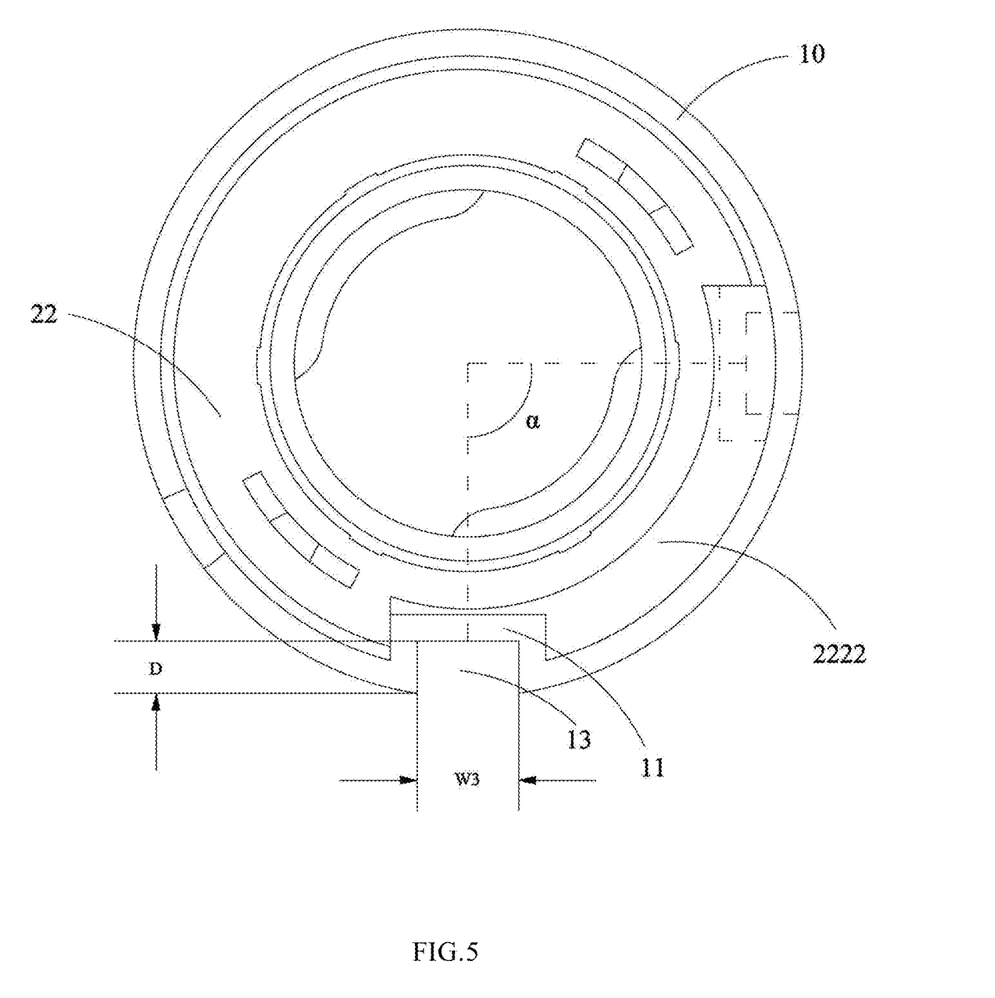
FIG. 5 is a schematic plan view of the first rod with a pipe sleeve mated.

Referring to FIGS. 2 and 4, the first rod 10 has a hollow shape and is provided with a first limiting piece 11. An outer diameter of the second rod 20 is smaller than an inner diameter of the first rod 10 so that the second rod 20 can be accommodated in the first rod 10. The second rod 20 includes a rod body 21 and a pipe sleeve 22 mounted at one end of the rod body 21. The rod body 21 is hollow and is provided with a first fixing portion 211. The pipe sleeve 22 includes a first pipe body 221 received in the rod body 21 and a second pipe body 222 located outside the rod body 21. The outer wall of the first pipe body 221 is provided with a convex rib 2211 so that the rod body 21 and the first pipe body 221 are fixed together by an interference fit. The second pipe body 222 is provided with a second fixing portion 2221 and a second limiting piece 2222. The second fixing portion 2221 cooperates with the first fixing portion 211 so that relative rotation between the second pipe body 222 and the rod body 21 cannot occur. In this embodiment, the first fixing portion 211 is a fixing groove recessing inward from the side wall of the rod body 21 in the axial direction thereof, and the second fixing portion 2221 is a fixing protrusion protruding along an axial direction of the second rod 20 to the rod body 21 from the intersection of the second tube body 222 and the first tube body 221. Of course, it will be understood that the structures of the first fixing portion 211 and the second fixing portion 2221 have various types, which will not be described in detail herein. The second limiting piece 2222 is used for being matched with the first limiting piece 11 to limit the rotation angle when the first rod 10 and the second rod 20 rotate relative to each other. Moreover, in the axial direction of the first rod 10, when telescopic movement occurs between the first rod 10 and the second rod 20, namely: when a length of part of the second rod 20 accommodated in the first rod 10 is adjusted, the first limiting piece 11 and the second limiting piece 2222 can play a guiding role. In this embodiment, the first limiting piece 11 is a guide protrusion protruding from the inner wall of the first rod 10 toward the second rod 20, and the second limiting piece 2222 is a limiting groove recessed inward from the outer wall of the second rod 20. In a circumferential direction of the first rod 10, the width W1 of the guide protrusion is smaller than the width W2 of the limiting groove. Referring to FIG. 5, when the guide protrusion is rotated from one end of the limiting groove to the other end, an angle α at which the guide protrusion is rotated about the axis of the first rod 10 is 90. Of course, it will be appreciated that in other embodiments, the size of the angle α may be set as desired. Further, in the axial direction of the first rod 10, the guide protrusion extends from one end to the other end of the first rod 10. In this embodiment, the limiting groove is provided only on the second pipe body 222. However, it will be appreciated that in other embodiments, the limiting groove may be provided as: in the axial direction of the second rod 20, the limiting groove extends from one end to the other end of the second rod 20.

As another embodiment, the first limiting piece 11 can also be provided with: a limiting groove recessing outward from the inner wall of the first rod 10, and a second limiting piece 2222 is provided as follows: a guide protrusion is protruded from the outer wall of the second rod 20 toward the first rod 10. At this time, in the circumferential direction of the first rod 10, the width of the guide protrusion is smaller than the width of the limiting groove.

Figure 6:
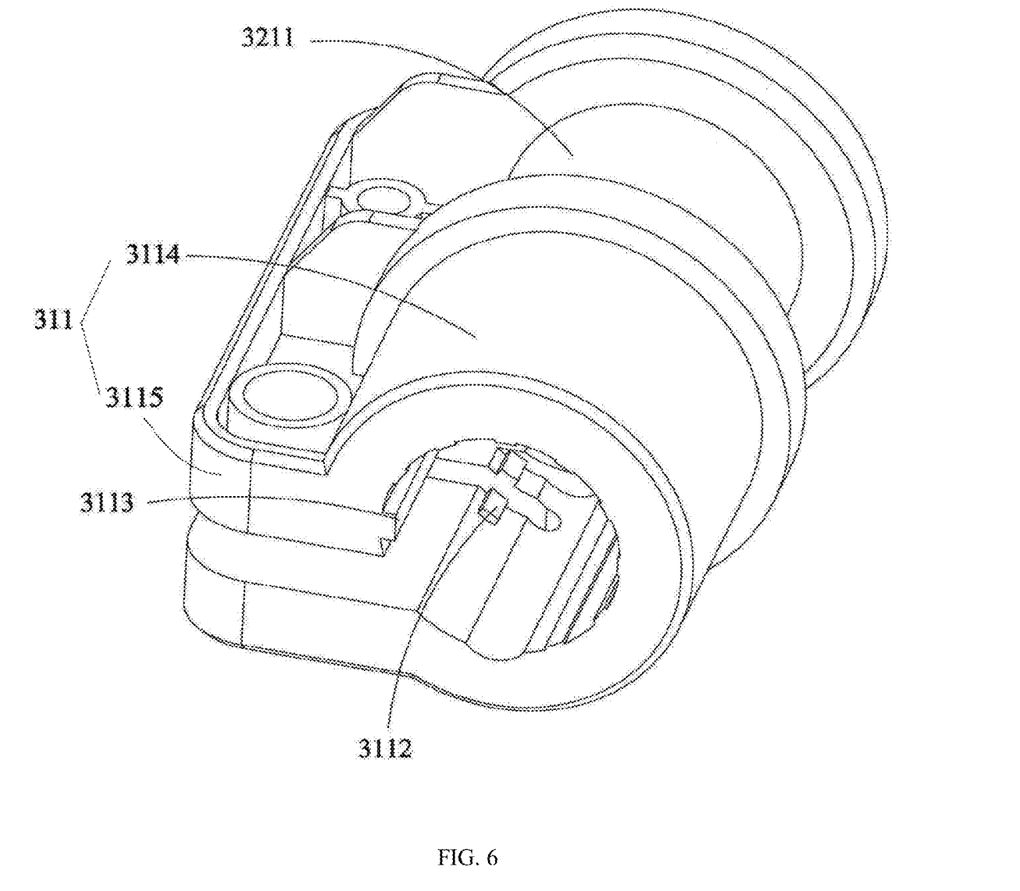
FIG. 6 is a perspective view of a first connecting portion and a second connecting portion.

Referring to FIGS. 1, 2, 6, 7 and 9, the connector 30 includes a first connecting mechanism 31 fixedly mounted to the first rod 10 and a second connecting mechanism 32 cooperating with the second rod 20. The first connecting mechanism 31 includes a first connecting portion 311 and a first locking portion 312. The first connecting portion 311 is C-shaped to hold the first rod 10. The first locking portion 312 serves to lock both ends of the first connecting portion 311. When the first locking portion 312 is changed from the released state to the locked state, both ends of the first connecting portion 311 gradually approach under the action of the first locking portion 312, so that the inner diameter of the first connecting portion 311 gradually becomes smaller, thereby clamping and holding the first rod 10. The side of the first connecting portion 311 facing the first rod 10 is further provided with a plurality of ribs 3111. The ribs 3111 cooperate with the first rod 10 to enhance the clamping force of the first connecting portion 311, while also increasing the frictional force between the first connecting portion 311 and the first rod 10. Referring to FIG. 6, further, a first positioning portion 3112 is provided on a side wall of the first connecting portion 311 facing the first rod 10. Referring to FIG. 4, the first rod 10 is provided with a second positioning portion 12 cooperating with the first positioning portion 3112 so that relative rotation between the first rod 10 and the first connecting portion 311 cannot occur by the cooperation of the first rod 10 and the first positioning portion 3112. In this embodiment, the first positioning portion 3112 is a positioning block, and the second positioning portion 12 is a positioning groove matched with the positioning block. Further, as shown in FIG. 6, the side of the first connecting portion 311 facing the first rod 10 is further provided with a rotation stopping block 3113. The first rod 10 is provided with a rotation stopping groove 13 cooperating with the rotation stopping block 3113 to further prevent relative rotation between the first rod 10 and the first connection portion 311 by the cooperation of the rotation stopping groove 13 and the rotation stopping block 3113. In this embodiment, the first rod 10 is configured to: the side wall of the first rod 10 is recessed radially inward thereof to simultaneously form a guide protrusion located inside the first rod 10 and a rotation stopping groove 13 located on the outer wall of the first rod 10. By means of the arrangement, processing procedures can be saved. In this embodiment, the first locking portion 312 is a screw.

Referring to FIGS. 1, 2, 6, 7 and 9, the second connecting mechanism 32 includes a second connecting portion 321 and a second locking portion 322. The second connecting portion 321 is C-shaped to hold the second rod 20. The second locking portion 322 serves to lock both ends of the second connecting portion 321. When the second locking portion 322 is changed from the released state to the locked state, both ends of the second connecting portion 321 gradually approach under the action of the second locking portion 322, so that the inner diameter of the second connecting portion 321 gradually decreases, thereby clamping and holding the second rod 20. The second locking portion 322 includes a second screw 3221 penetrating both ends of the second connecting portion 321 and an operating member 3223 pivotally mounted to the second screw 3221 through a second pivot 3222. The second screw 3221 passes through the second pivot 3222 so that the second pivot 3222 can slide along the second screw 3221. When the operating member 3223 is in a locked state, that is: when one end of the operating member 3223 is fastened to the second connecting portion 321, the eccentric protrusion 3224 abuts against one end of the second connecting portion 321 so that both ends of the second connecting portion 3221321 gradually approach, thereby gradually reducing the inner diameter of the second connecting portion 3221321, thereby clamping and holding the second rod 20. When the operating member 3223 is in the released state, the user can rotate the first rod 10 or the second rod 20, and can also adjust the length of the portion of the second rod 20 accommodated in the first rod 10, that is: realizing telescopic adjustment. In this embodiment, the connector 30 is configured to lock or release the second rod 20, but in other embodiments, the connector 30 may be configured to lock or release the first rod 10.

Figure 7:
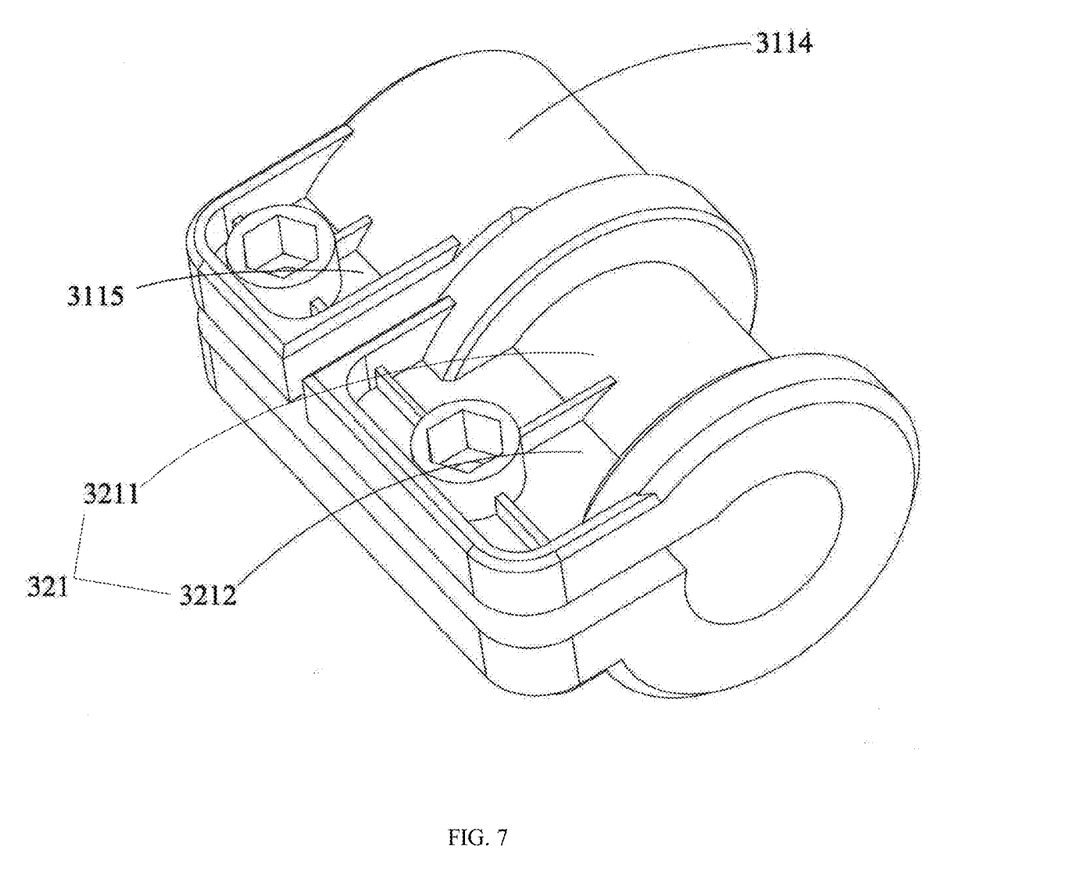
FIG. 7 is a perspective view of another angle of the first connecting portion and the second connecting portion.
Figure 8:
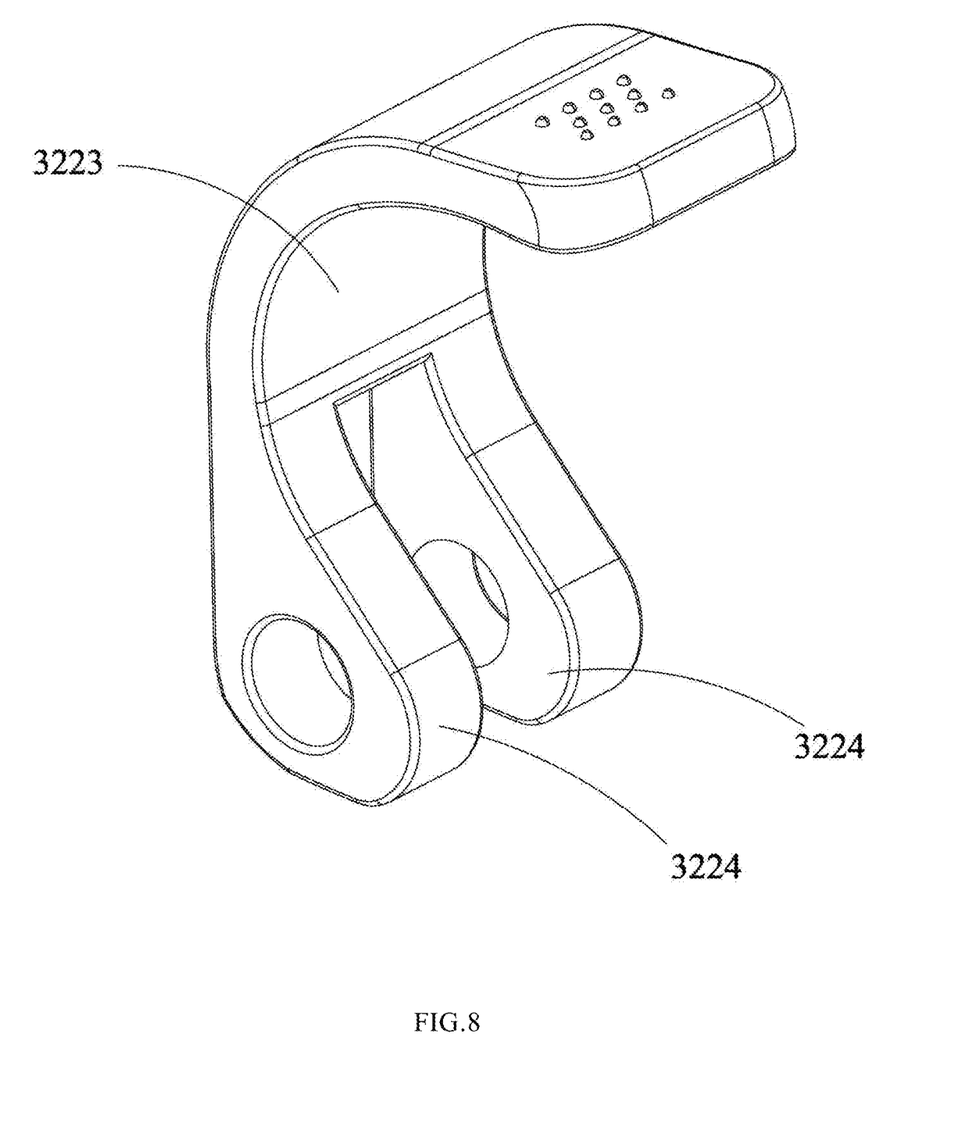
FIG. 8 is a perspective view of an operating member.
Figure 9:
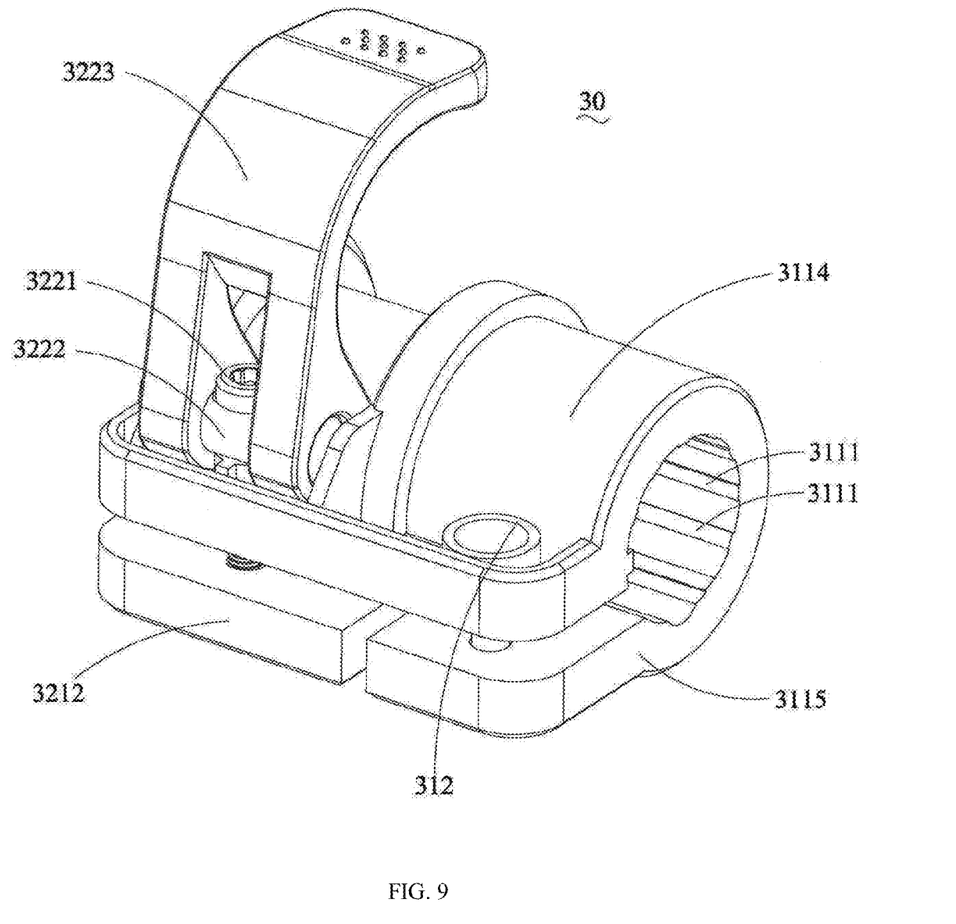
FIG. 9 is a perspective view of a connector.

Further, the first connection portion 311 includes a first connecting main body 3114 and a first extending portion 3115 extending outward from one end of the first connecting main body 3114. The first locking portion 312 is used to lock the first connecting main body 3114 and the first extending portion 3115 so that the first connecting main body 3114 and the first extending portion 3115 are close to each other, thereby locking the first rod 10. The second connecting portion 321 includes a second connecting main body 3211 and a second extending portion 3212 extending outward from one end of the second connecting main body 3211. The second locking portion 322 is used for locking the second connecting main body 3211 and the second extending portion 3212 so that the second connecting main body 3211 and the second extending portion 3212 are close to each other, thereby locking the second rod 20. The first connecting main body 3114 and the second connecting main body 3211 are an integral component, and a gap is formed between the first extending portion 3115 and the second extension portion 3212.

Preferably, the outer diameter of the first rod 10 is 25 mm and the outer diameter of the second rod 20 is 19 mm. When the first connection portion 311 is in a relaxed state, the inner diameter of the first connection portion 311 is 25.2 mm. When the second connection portion 321 is in a relaxed state, the inner diameter of the second connection portion 321 is 19.2 mm. Referring to FIG. 5, the width W3 of the rotation stopping groove 13 is between 3 mm and and 5 mm, and the depth D thereof is between at 1 mm and 3.5 mm. Preferably, the width W3 is 3.6 mm and the depth D is 2 mm.

The operating rod assembly 100 provided by the disclosure not only can realize the telescopic function, but also can realize the rotary function, and is simple in structure, convenient to operate, low in production cost and capable of improving user experience.

Figure 10:
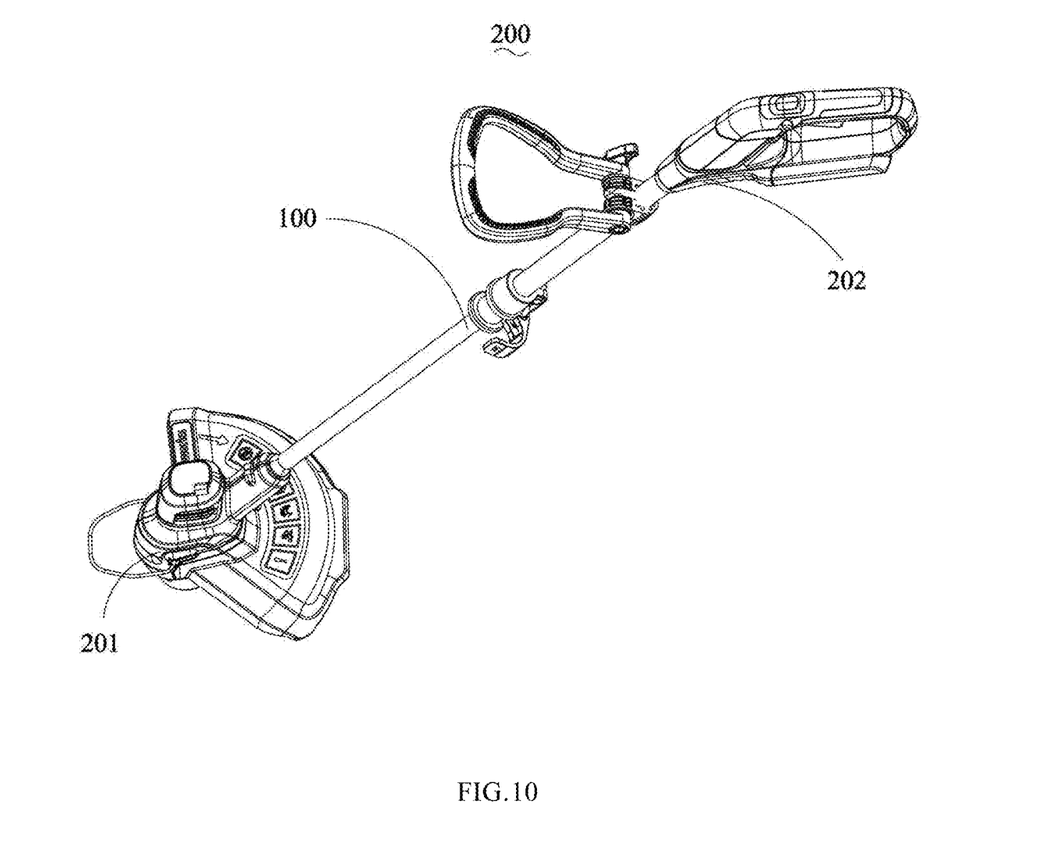
FIG. 10 is a perspective view of the string trimmer.

Referring to FIG. 10, the disclosure further shows a string trimmer 200, the string trimmer includes an operating mechanism 201, a handle assembly 202, and an operating rod assembly 100. The operating mechanism 201 is arranged at one end of the rod assembly 100, and the handle assembly 202 is arranged at the other end of the rod assembly 100. When it is necessary to switch the string trimmer 200 from the grass mowing state to the trimming state, the user simply opens the operating member 3223, rotates the first rod 10 or the second rod 20, and then closes the operating member 3223. When it is necessary to switch the string trimmer 200 from the trimming state to the grass mowing state, it is still possible to operate as described above.

The above embodiments are only used to illustrate the technical solutions of the disclosure and not to limit them. Although the disclosure has been described in detail with reference to the preferred embodiments, those of ordinary skill in the art should understand that the technical solutions of the disclosure can be modified or equivalently replaced, without deportioning from the spirit and scope of the technical solution of the disclosure.

What is claimed is:
1. An operating rod assembly comprising:
a first rod, wherein the first rod is hollow and provided with a first limiting piece;
a second rod, wherein
an outer diameter of the second rod is smaller than an inner diameter of the first rod, and the second rod is provided with a second limiting piece matched with the first limiting piece so as to limit a rotation angle of the first rod around the second rod; and a connector, being used for connecting the first rod and the second rod, wherein
when the connector is in a locking state, two ends of the connector respectively lock the first rod and the second rod, and
when the connector is in a loosening state, the connector releases the second rod or the first rod, and the first rod and the second rod are capable of rotating and stretching relative to each other;
the second rod comprises a rod body and a pipe sleeve arranged at one end of the rod body, and
the second limiting piece is arranged on the pipe sleeve.

2. The operating rod assembly of claim 1, wherein
the first limiting piece is a guide protrusion protruding from an inner wall of the first rod to the second rod,
the second limiting piece is a limiting groove sinking inward from an outer wall of the second rod, and
the limiting groove is matched with the guide protrusion to limit the rotation angle between the first rod and the second rod.

3. The operating rod assembly of claim 1, wherein
the first limiting piece is a limiting groove recessing inward from an inner wall of the first rod, and
the second limiting piece is a guide protrusion protruding from an outer wall of the second rod to the first rod.

4. The operating rod assembly of claim 1, wherein
the rod body is provided with a first fixing portion, and the pipe sleeve is provided with a second fixing portion matched with the first fixing portion so as to fix the pipe sleeve on the rod body,
the pipe sleeve comprises a first pipe body accommodated in the second rod and a second pipe body arranged outside the second rod, and the second limiting piece is arranged on the second pipe body,
the second fixing portion is a fixing protrusion protruding from an intersection of the second pipe body and the first pipe body along an axial direction of the second rod to the rod body, and
the first fixing portion is a fixing groove concaving inwards from a side wall of the rod body along an axial direction thereof.

5. The operating rod assembly of claim 1, wherein
the connector comprises a first connecting mechanism fixedly arranged on the first rod and a second connecting mechanism matched with the second rod,
the second connecting mechanism comprises a second connecting portion which is C-shaped and is used for clamping the second rod and a second locking portion which is used for locking two ends of the second connecting portion,
when the second locking portion is changed from the releasing state to the locking state, the two ends of the second connecting portion gradually approach under an action of the second locking portion, so that an inner diameter of the second connecting portion is gradually reduced, and the second rod is locked.

6. The operating rod assembly of claim 5, wherein
the second connecting portion comprises a second connecting main body and a second extending portion extending outwards from one side of the second connecting main body, the second connecting main body is integrated with the first connecting mechanism, and a gap is formed between the second extending portion and the first connecting mechanism.

7. The operating rod assembly of claim 6, wherein
the second locking portion includes a screw passing through both ends of the second connecting portion and an operating member having an eccentric protrusion,
the operating member is pivotally arranged on the screw by a second pivot, the second pivot being slidable along the screw.

8. The operating rod assembly of claim 7, wherein
the first connecting mechanism comprises a first connecting portion which is C-shaped and is used for clamping the first rod and a first locking portion which is used for locking two ends of the first connecting portion,
when the first locking portion is changed from the releasing state to the locking state, the two ends of the first connecting portion gradually approach under an action of the first locking portion, so that an inner diameter of the first connecting portion is gradually reduced, and the first rod is held.

9. The operating rod assembly of claim 8, wherein
the first connecting portion comprises a first connecting main body and a first extending portion extending outwards from one end of the first connecting main body,
the first connecting main body and the second connecting main body are an integrated component, and a gap is formed between the first extending portion and the second extending portion.

10. The operating rod assembly of claim 9, wherein
an inner side of the first connecting portion is provided with a rib matched with the first rod so as to enhance friction between the first connecting portion and the first rod.

11. The operating rod assembly of claim 9, wherein
a first positioning portion is arranged on the inner side of the first connecting portion, and a second positioning portion matched with the first positioning portion is arranged on the first rod, so as to limit a relative rotation between the first rod and the first connecting portion through the matching of the first positioning portion and the second positioning portion.

12. A string trimmer comprising:
an operating mechanism;
a handle assembly; and
an operating rod assembly, the operating rod assembly comprising,
a first rod, wherein the first rod is hollow and provided with a first limiting piece;
a second rod, wherein
an outer diameter of the second rod is smaller than an inner diameter of the first rod, and
the second rod is provided with a second limiting piece matched with the first limiting piece so as to limit a rotation angle of the first rod around the second rod; and
a connector, being used for connecting the first rod and the second rod, wherein
when the connector is in a locking state, two ends of the connector respectively lock the first rod and the second rod, and
when the connector is in a loosening state, the connector releases the second rod or the first rod, and the first rod and the second rod are capable of rotating and stretching relative to each other;

wherein the operating mechanism is arranged at one end of the operating rod assembly, and the handle assembly is arranged at the other end of the operating rod assembly;

the second rod comprises a rod body and a pipe sleeve arranged at one end of the rod body, and the second limiting piece is arranged on the pipe sleeve.

13. The string trimmer of claim 12, wherein the first limiting piece is a guide protrusion protruding from an inner wall of the first rod to the second rod, the second limiting piece is a limiting groove sinking inward from an outer wall of the second rod, and the limiting groove is matched with the guide protrusion to limit the rotation angle between the first rod and the second rod.

14. The string trimmer of claim 12, wherein the first limiting piece is a limiting groove recessing inward from an inner wall of the first rod, and the second limiting piece is a guide protrusion protruding from an outer wall of the second rod to the first rod.

15. The string trimmer of claim 12, wherein the rod body is provided with a first fixing portion, and the pipe sleeve is provided with a second fixing portion matched with the first fixing portion so as to fix the pipe sleeve on the rod body, the pipe sleeve comprises a first pipe body accommodated in the second rod and a second pipe body arranged outside the second rod, and the second limiting piece is arranged on the second pipe body, the second fixing portion is a fixing protrusion protruding from an intersection of the second pipe body and the first pipe body along an axial direction of the second rod to the rod body, and the first fixing portion is a fixing groove concaving inwards from a side wall of the rod body along an axial direction thereof.

16. The string trimmer of claim 12, wherein the connector comprises a first connecting mechanism fixedly arranged on the first rod and a second connecting mechanism matched with the second rod, the second connecting mechanism comprises a second connecting portion which is C-shaped and is used for clamping the second rod and a second locking portion which is used for locking two ends of the second connecting portion, when the second locking portion is changed from the releasing state to the locking state, the two ends of the second connecting portion gradually approach under an action of the second locking portion, so that an inner diameter of the second connecting portion is gradually reduced, and the second rod is locked.

17. The string trimmer of claim 16, wherein the second connecting portion comprises a second connecting main body and a second extending portion extending outwards from one side of the second connecting main body, the second connecting main body is integrated with the first connecting mechanism, and a gap is formed between the second extending portion and the first connecting mechanism.

18. The string trimmer of claim 17, wherein the second locking portion includes a screw passing through both ends of the second connecting portion and an operating member having an eccentric protrusion, the operating member is pivotally arranged on the screw by a second pivot, the second pivot being slidable along the screw.

* * * * *